US011900087B1

(12) United States Patent
Zhang et al.

(10) Patent No.: US 11,900,087 B1
(45) Date of Patent: Feb. 13, 2024

(54) APPLICATION BINARY REPLATFORMING AS A SERVICE

(71) Applicant: Amazon Technologies, Inc., Seattle, WA (US)

(72) Inventors: Jiangtao Zhang, Pleasanton, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 17/702,555

(22) Filed: Mar. 23, 2022

(51) Int. Cl.
*G06F 8/52* (2018.01)
*G06F 8/76* (2018.01)
*G06F 8/41* (2018.01)

(52) U.S. Cl.
CPC ............... *G06F 8/52* (2013.01); *G06F 8/47* (2013.01); *G06F 8/76* (2013.01)

(58) Field of Classification Search
None
See application file for complete search history.

(56) References Cited

U.S. PATENT DOCUMENTS

| 7,765,539 B1 * | 7/2010 | Elliott | G06F 8/76 717/145 |
| 7,765,543 B1 * | 7/2010 | Weissman | G06F 9/5022 718/1 |
| 8,346,854 B2 * | 1/2013 | Cherukuri | G06F 9/541 709/219 |
| 8,352,944 B2 * | 1/2013 | Weissman | G06F 9/45558 718/1 |

(Continued)

FOREIGN PATENT DOCUMENTS

CN      114115990 A   *   3/2022

OTHER PUBLICATIONS

Chen, Jiunn-Yeu, et al. "On static binary translation of arm/thumb mixed isa binaries." ACM Transactions on Embedded Computing Systems (TECS) 16.3 (2017): 1-25. (Year: 2017).*

(Continued)

*Primary Examiner* — Matthew J Brophy
(74) *Attorney, Agent, or Firm* — Nicholson De Vos Webster & Elliott LLP

(57) ABSTRACT

Techniques are described for a software modernization service to provide the ability to re-platform software application binaries from one ISA and hardware platform to another. The software modernization service can generate assessment reports for users' legacy applications, including recommendations for hardware platforms available in a cloud provider network for use. Responsive to a user requesting to re-platform an application from one ISA and hardware platform to another, an application re-platforming service automates steps to perform a static and dynamic binary translation of an application and to combine the results into a re-platformed executable. Among other benefits, the described techniques enable the deployment of legacy software applications onto a wider set of target ISA and hardware platforms, thereby enabling such applications to take advantage of the performance, scalability, availability, and other benefits of certain types of hardware platforms as desired by a user.

20 Claims, 8 Drawing Sheets

(56) References Cited

U.S. PATENT DOCUMENTS

| | | | | |
|---|---|---|---|---|
| 8,510,723 | B2* | 8/2013 | Barua | G06F 8/52 717/136 |
| 9,348,592 | B2* | 5/2016 | Jha | G06F 9/383 |
| 9,928,062 | B2* | 3/2018 | Azagury | G06F 8/76 |
| 10,684,984 | B2* | 6/2020 | Tamir | G06F 9/455 |
| 10,831,474 | B2* | 11/2020 | Azagury | G06F 9/30145 |
| 10,877,739 | B1* | 12/2020 | Fernandez | G06F 9/455 |
| 10,983,804 | B1* | 4/2021 | Durkop, III | G06F 8/658 |
| 11,416,243 | B2* | 8/2022 | Hwang | H04L 41/16 |
| 2003/0159134 | A1* | 8/2003 | Souloglou | G06F 8/44 717/148 |
| 2004/0194070 | A1* | 9/2004 | Baraz | G06F 8/52 717/136 |
| 2010/0257524 | A1* | 10/2010 | Weissman | G06F 11/3466 718/1 |
| 2010/0306746 | A1* | 12/2010 | Barua | G06F 8/52 717/136 |
| 2014/0095832 | A1* | 4/2014 | Haber | G06F 9/30181 712/205 |
| 2014/0130026 | A1* | 5/2014 | Yohn | G06F 9/4552 717/151 |
| 2014/0195774 | A1* | 7/2014 | Jha | G06F 9/30018 711/215 |
| 2015/0277880 | A1* | 10/2015 | Gschwind | G06F 8/4435 717/159 |
| 2017/0039050 | A1* | 2/2017 | Eltsin | G06F 9/4552 |
| 2018/0173524 | A1* | 6/2018 | Azagury | G06F 9/30181 |
| 2018/0285099 | A1* | 10/2018 | Mandava | G06F 11/3668 |
| 2019/0324755 | A1* | 10/2019 | Herr | G06F 8/52 |
| 2020/0409677 | A1* | 12/2020 | Fernandez | G06F 9/455 |
| 2021/0232390 | A1* | 7/2021 | Hwang | H04L 41/16 |
| 2021/0271466 | A1* | 9/2021 | Sridhara | G06F 8/65 |
| 2023/0113783 | A1* | 4/2023 | Le | G06F 8/51 717/137 |
| 2023/0161613 | A1* | 5/2023 | Rajendran | G06F 9/45558 718/1 |

OTHER PUBLICATIONS

Wang, Jun, et al. "Dynamic translation optimization method based on static pre-translation." IEEE Access 7 (2019): 21491-21501. (Year: 2019).*

Wang, Wenwen, et al. "A General Persistent Code Caching Framework for Dynamic Binary Translation ({DBT})." 2016 {USENIX} Annual Technical Conference ({USENIX}{ATC} 16). 2016. (Year: 2016).*

* cited by examiner

APPLICATION BINARY REPLATFORMING AS A SERVICE

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially thousands or millions of users, have global availability, manage very large amounts of data, and respond to requests in milliseconds. The processes for upgrading, converting, rewriting, and performing other operations on such applications to enable improved performance is referred to broadly as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
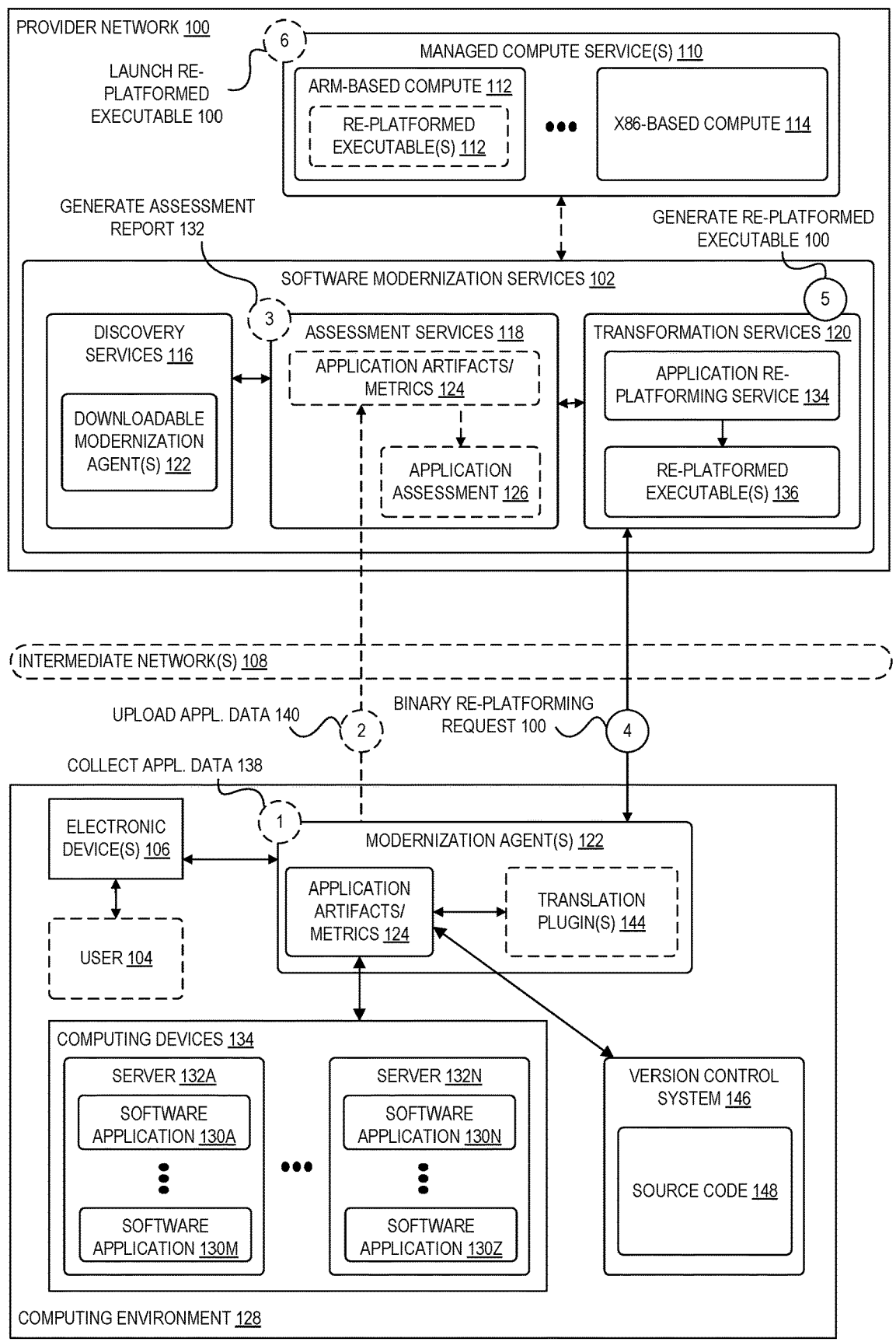
FIG. 1 is a diagram illustrating an environment for providing an application binary re-platforming service as part of software modernization services provided by a cloud provider network according to some examples.

The present disclosure relates to methods, apparatus, systems, and non-transitory computer-readable storage media for providing a software modernization service that enables users to re-platform software application binaries from one hardware platform and associated instruction set architecture (ISA) to another (e.g., from x86-64 to ARM, from PowerPC to x86-32, or other similar conversions). Business entities and other users often have numerous software applications running in their computing environments and which have been developed over the years for various target hardware platforms. These software applications are typically executed based on executable files created by the developers of the applications. An executable software program (sometimes referred to simply as an executable or binary) is a file that causes a computing device capable of understanding instructions encoded in the file to perform the tasks for which a software application was designed. Typically, a binary is originally coded by a software developer in source code using a high-level programming language, where that source code is then compiled into an executable software program. The compilation of the source code typically involves the creation of an executable software program containing instructions executable by a particular operating system (e.g., Windows) and hardware platform (e.g., x86 or ARM).

A binary compiled for one operating system/hardware platform generally cannot be executed directly on a different operating system/hardware platform because the machine instruction code differs from one platform to the next (e.g., a program compiled for an x86-64 system cannot natively execute on an ARM system). However, users may sometimes desire to deploy their legacy applications on hardware platforms that differ from the one for which the application was originally compiled. For example, some cloud service provides might provide multiple different types of managed compute services and associated hardware platforms, each with different performance, price, and other tradeoffs for users to consider when migrating their applications to the cloud. However, the ISA and hardware platform for which a software application is originally compiled may limit these choices without a means to readily port a software application from one ISA to another. In some cases, it may be possible to cross-compile an application from one ISA and hardware platform to another—however, these processes may not always be feasible depending, e.g., on the origin of the application and the accessibility of the application's original source code.

One possible solution for executing software applications across different ISAs and hardware platforms is to use emulation software. Emulation software broadly enables a binary executable to be executed using an emulation layer that translates instructions from a source instruction set to a target instruction set dynamically. However, the overhead of performing such emulation can be significant and is often unsuitable for resource-intensive applications. Another possible solution is static binary translation. Using static binary translation, the sequence of machine instructions contained in an application binary is translated from a source instruction set to a target instruction set without executing the binary executable. However, a static binary translation alone is typically insufficient to obtain a fully functional application since there are many runtime execution branches that cannot be discovered statically.

Yet another solution is to use dynamic binary translation. A dynamic binary translation process involves the selection of short sequences of machine code (e.g., at a function level or other scope), the translation of the machine code to a target platform sequence, and then the translated code is cached for future executions natively. However, even in such cases, there may be branches of code that are not covered during a period of time and the translation may not be entirely complete. Furthermore, using static and dynamic binary translation tools effectively is challenging for many users and thus many users resign themselves to working with legacy applications as is.

The aforementioned challenges, among others, are addressed by a modernization service that provides the ability to automate the re-platforming of software application binaries from one ISA and hardware platform to another. According to examples described herein, the software modernization service can generate assessment reports for users' legacy applications, including recommendations for hardware platforms available in a cloud provider network for use. In some examples, responsive to a user requesting to re-platform an application from one ISA and hardware platform to another, an application re-platforming service automates steps to perform a static and dynamic binary translation of an application and to combine the results into a re-platformed executable. This re-platformed executable can be deployed, for example, to compute resources in a cloud provider network matching the target platform or to any other computing environment. Among other benefits, the techniques described herein enable the deployment of legacy software applications onto a wider set of target ISA and hardware platforms, thereby enabling such applications to take advantage of the performance, scalability, availability, and other benefits of certain types of hardware platforms as desired by a user.

FIG. 1 is a diagram illustrating an environment for providing an application binary re-platforming service as part of software modernization services provided by a cloud provider network according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, software modernization services 102 that can help users modernize their software applications and computing environments, etc. The users (or "customers") of provider networks 100 can use one or more user accounts that are associated with a customer account, though these terms can be used somewhat interchangeably depending upon the context of use. Users (e.g., a user 104) can use computing devices (e.g., an electronic device 106) to interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

The managed compute service(s) 110 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the servers provided by a managed compute service 110 can be based on hardware platforms implementing any of several different ISA including, for example, ARM-based compute 112, x86-based compute 114, PowerPC-based compute, or any other ISAs. For example, a managed compute service 110 can enable users to provision VMs or physical servers implementing particular ISAs depending on users' desired operating environments.

Another example of a managed compute service 110 is a container service, which can be a container orchestration and management service (referred to in various implementations as a container service, cloud container service, container engine, or container cloud service) that allows users of the cloud provider network to instantiate and manage containers. In some examples, the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Yet another example of a managed compute service 110 is an on-demand code execution service (referred to in various embodiments as a function compute service, functions service, cloud functions service, functions as a service, or serverless computing service), which can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

In some examples, a software modernization service 102 provides various types of software modernization services and functionality, including discovery services 116, assessment services 118, and transformation services 120, which are collectively aimed at helping users to discover and use recommended modernization and migration paths for their software applications. The discovery services 116, for example, provide various services, software applications, software agents, and other tools (e.g., including downloadable modernization agents 122) used to identify software applications in users' computing environments and to collect artifact and profiling information for software applications undergoing modernization processes. The assessment services 118 enable users and applications to obtain various types of software modernization assessments and recommendations, e.g., based on analyses of application artifacts (e.g., application artifacts 124, such as source code, bytecode, executable binaries, etc.) and application profiling metrics collected for users' applications by the discovery services 116 and associated tools. For example, the recommendations generated by an assessment service 118 (e.g., as compiled into an application assessment 126) can include recommended modernization strategies, recommended modernization tools, recommended compute services 110 and associated hardware platforms, estimated modernization costs, etc. In some examples, transformation services 120 include various services, applications, and other tools used to perform modernization actions and migrations, possibly based, for example, on modernization recommendations generated by assessment services 118.

According to examples described herein, a software modernization system can be used to automate the re-platforming of users' software applications from one hardware platform and ISA to another (e.g., to re-platform an x86-based software application in a user's computing environment 128 to be deployed on ARM-based compute 112 resources within the cloud provider network 100). In some examples, a modernization agent 122 includes or interfaces with one or more application analyzers configured to statically and dynamically analyze application artifacts (e.g., application artifacts 124 including source code, bytecode, or other associated artifacts) obtained for software applications undergoing analysis (e.g., any of software applications 130A, ..., 130M, 130N, ..., 130Z running on servers 132A, ..., 132N and computing devices 134 generally) and to optionally obtain other application analysis feeds. In some examples, some or all the source code files, bytecode files, binaries, and other application artifacts for a software application under analysis can be obtained from a version control system (e.g., source code 148 from a version control system 146), automation server, or other storage locations within or external to a user's computing environment 128.

In some examples, application analyzers that are part of or separate from the modernization agent(s) 122 generate application profiling metrics related to application components and dependency relationships among application components (e.g., packages, files, classes, methods, variables, etc.), including static and runtime analysis information, version control system commit information, and the like. In some examples, the application artifacts and metrics 124 can be used by an assessment service 118 to obtain a collection of application features for a software application, where such features can be used as input to various models and analysis processes to assess the characteristics of the application. As shown in FIG. 1, these processes can include translation plugin(s) 144, as described in more detail herein, implemented by a modernization agent 122, transformation service 120, or combinations thereof.

In FIG. 1, the circles labeled "1"-"6" illustrate an example process in which an software modernization service 102 generates an application assessment for a software application originating from a computing environment 128, receives and processes a request to re-platform the software application to a desired target hardware platform and ISA, and optionally launches the re-platformed application using compute resources associated with the target hardware platform and ISA. As indicated, the re-platforming of software applications in this manner can help users modernize their applications to other hardware platforms and ISA which may provide certain performance, availability, cost, and other benefits.

In some examples, in FIG. 1, a user accesses the software modernization service 102 (for example, via various interfaces provided by discovery services 116) to obtain information about available modernization services and tools and to obtain one or more downloadable modernization agents 122. The user can download one or more modernization agents 122 and install the agents on servers within the user's on-premises computing environment 128 (e.g., on physical servers or VMs). In some examples, users (e.g., a user 104) can use a computing device 106 to interact with the modernization agent 122 via a command line interface (CLI), graphical user interface (GUI), or any other type of interface provided by the modernization agent 122. For example, in FIG. 1, a user 104 has obtained and installed the modernization agent 122, possibly including one or more application analyzers, translation plugin(s) 144, among other components, on a computing device within the user's computing environment 128 (e.g., at an on-premises datacenter or other type of user computing environment) to assist with modernizing one or more software applications 130A, ..., 130Z running or under development in the user's computing environment 128. The software applications 130A, ..., 130Z, for example, may include one or more applications deployed or under development on one or more Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some examples, a user invokes at circle "1" an inventory and application data collection command used to identify applications within the user's computing environment 128 that can be assessed (e.g., including some or all of software applications 130A, ..., 130Z in the example of FIG. 1) and to collect 138 application profile data (e.g., including application artifacts and metrics 124). In some examples, instead of interacting directly with the modernization agent 122, the user 104 instead interacts with a web-based console or other interface provided by the software modernization service 102. The software modernization service 102 may then in turn instruct a modernization agent 122 or other application running in the user computing environment 128 to perform some or all of the application inventory and profiling metrics collection operations described in reference to FIG. 1 such as, for example, identifying an inventory of applications, obtaining application artifacts and metrics 124 for the applications (e.g., including source code or binary executable file information identifying JAR files, DLL files, process identifiers, etc.), among other possible types of application profile information described herein.

In some examples, a modernization agent 122 or other application collects dynamic runtime information about discovered software applications including, e.g., process identifiers, runtime artifacts such as binary executables, JAR files, DLL files, etc. A modernization agent 122 can optionally further collect source code stored in a version control system or other storage location within the user's computing environment 128 or elsewhere. In some examples, a user provides a modernization agent 122, software modernization service 102, or both, with authentication information (e.g., a username and password, security token, etc.) that can be used to access the version control system based on a URL or other access identifier.

In some examples, the modernization agent uploads 140 application artifacts and application profiling metrics, including identifiers of the discovered software applications in the user's computing environment 128. The assessment service 118 can use the uploaded application artifacts and profiling data, for example, to create a software application list that associates the identified software applications with a user account used by the user 104. The software application list, for example, may be displayed to a user in a GUI or other interface to provide a user with information about the discovered set of applications in the user's computing environment 128. In other examples, the application profile data is stored only locally by the modernization agent 122.

As indicated, at circle "3" and in some examples, either an assessment service 118 or modernization agent 122 further initiates processes to analyze a software application identified by the modernization agent 122 to obtain application profiling metrics 124 and generate 142 a corresponding application assessment 126 with various recommendations. In some examples, the software modernization service 102 or modernization agent 122 receives a request to view an application assessment including, e.g., an identification of applications, application characteristics, migration options (e.g., to various possible managed compute service(s) 110 platforms), and the like. In some examples, responsive to such requests, an assessment service 118 generates or otherwise obtains application artifacts and metrics 124, provides them to the assessment service 118, which in turn generates an application assessment 126.

Upon viewing the application assessment 126 (e.g., in a web-based console or downloadable report), a user might specify that they desire to reduce cost or improve performance of selected applications, or provide other desired operational characteristics for their application, resulting in recommendations of one or more possible managed compute service(s) 110. If the user selects a desired target platform that differs from a hardware platform for which the application is currently designed, the assessment service 118 can further recommend to the user processes for re-platforming the selected application(s). In some examples, if a user requests to re-platform their application from one hardware platform/ISA to another to take advantage of one or more managed compute service(s) 110, either responsive to an application assessment 126 or based on a separate request, the assessment service 118 schedules processes to be performed by an application re-platforming service 134. The application re-platforming service 134 can then, using processes described in more detail herein, generate a new re-platformed executable 136 in a format that can be deployed to computing resources implementing the requested hardware platform and associated ISA.

In some examples, responsive to receiving a request to re-platform an application binary, the application re-platforming service 134 generates a task identifier used to track the translation procedures. For example, the identifier can be used to obtain a status of static and dynamic translation processes (e.g., to indicate whether either or both processes are in progress or complete) and an indication of whether a re-platformed executable is yet available for deployment or download.

Figure 2:
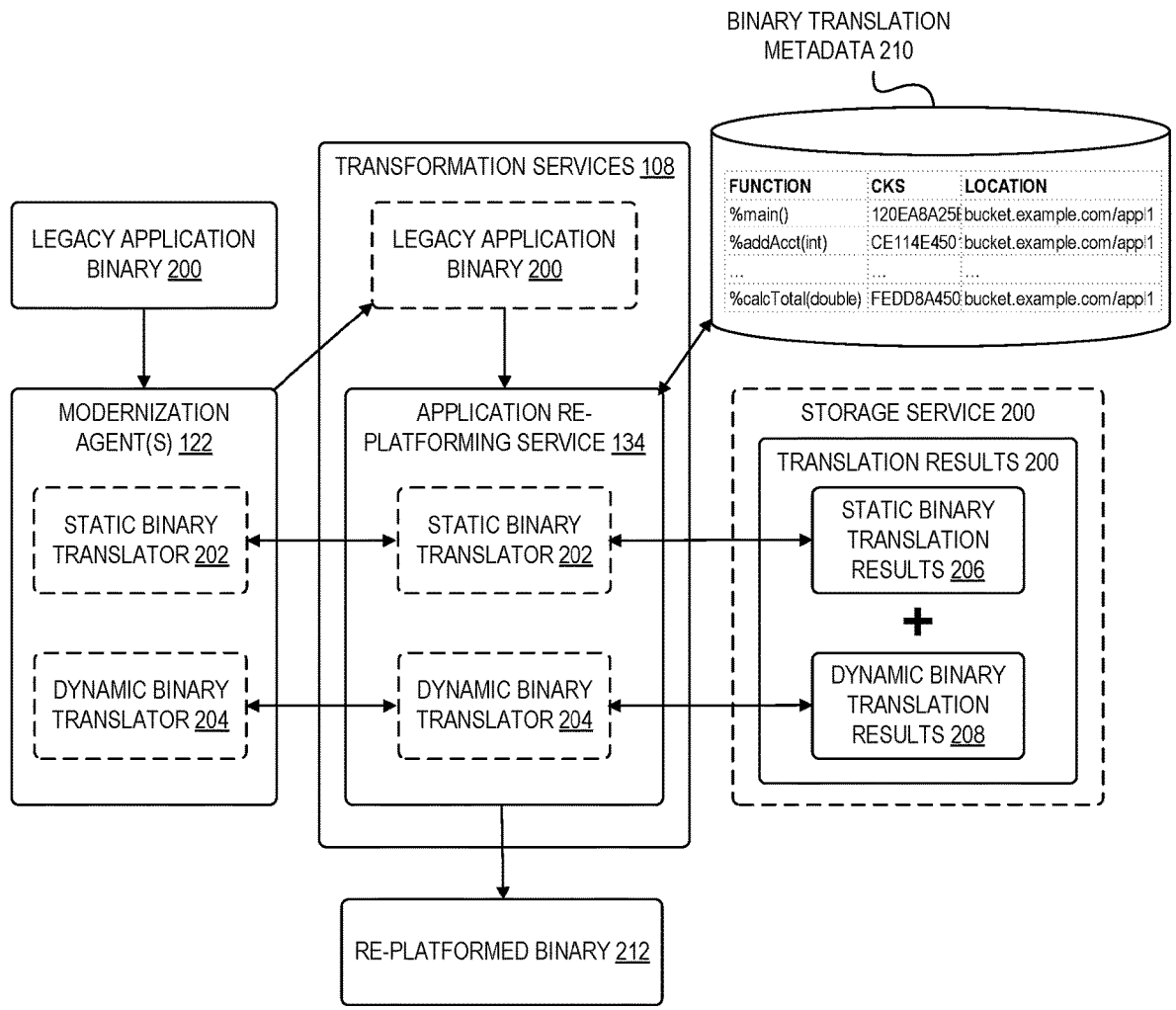
FIG. 2 is a diagram illustrating a hybrid binary translation process used by a software modernization service to re-platform a software application from a first ISA to a second ISA to some examples.

FIG. 2 is a diagram illustrating a hybrid binary translation process used by a software modernization service to re-platform a software application from a first ISA to a second ISA to some examples. In some examples, the application re-platforming processes described herein are implemented by a software modernization service 102 using hybrid of both static binary translation and dynamic binary translation processes to generate a re-platformed application binary. In FIG. 2, an example process for re-platforming a legacy application binary 200 is illustrated, where a modernization agent 122 might initially discover and obtain the legacy application binary 200 as described above. As further illustrated, each of the modernization agent(s) 122 running in a user's computing environment 128 and an application re-platforming service 134 can include a static binary translator 202 and dynamic binary translator 204 tools (e.g., corresponding to the translation plugin(s) 144 shown in FIG. 1). In various examples, the static and dynamic binary translation processes performed by these tools can be performed entirely by a modernization agent 122, entirely by an application re-platforming service 134, or using a combination of both or other components of the system.

In some embodiments, a modernization agent 122 or application re-platforming service 134 performs a static binary translation of the legacy application binary 200 to obtain static binary translation results 206. For example, either the agent 122 or application re-platforming service 134 can obtain the encoded instructions from the legacy application binary 200 and convert each instruction into a corresponding instruction for the target architecture (e.g., if the legacy application binary 200 is a x86-32 application and the target architecture is ARM, each instruction can be converted from an x86-32 instruction to an ARM instruction and stored as static binary translation results 206. As indicated above, the static binary translation of a source application may be incomplete since oftentimes not all of the code of an application can be discovered by a static binary translator tool (e.g., due to the existence of indirect branches and other code patterns that are discoverable only at runtime).

However, to the extent that the static binary translator 202 can translate certain portions of the code, information about those translations can be stored as binary translation metadata 210 in a database or other datastore. As shown, the binary translation metadata 210 can include information indicating, for the legacy application binary 200, identifications of translated portions of the legacy application code (e.g., function identifiers, class identifiers, etc.), a checksum of the instructions associated with the original portions of code, and storage locations of the translated code for each code portion, among other possible information. The checksums, for example, can be used to determine whether an identified portion of code has already been translated or, for example, whether the code associated with a code portion to be translated has changed (e.g., as described below, during dynamic translation, the code for a function or other code segment might change during runtime due to branch conditions, function inputs, etc.). In this manner, during static and dynamic binary translation, the translator tools can determine whether portions of the code have already been translated. Furthermore, the application re-platforming service 134 can use the information stored in the binary translation metadata 210 to aggregate the obtained translation at the end of the process to produce the re-platformed binary 212.

In some examples, in addition to the static binary translation of the legacy application binary 200, the modernization agent 122 or application re-platforming service 134 further performs a dynamic binary translation of the binary.

Here, the agent or service loads sequences of instructions (e.g., on the order of a single function or basic block), translates the instructions, and stores the dynamic binary translation results 208. During this translation, branch instructions and other runtime code paths can be followed to cover more of the code used to execute the application compared to the static binary translation process. Similar to the static binary translation processes, the agent or service further stores information about translated code portions as binary translation metadata 210 (and can skip translating portions of code already translated by the static binary translation processes, where the agent or service can confirm that the portions of code are the same by comparing a checksum for the code against that stored in the metadata 210).

In some examples, during the dynamic binary translation processes, an agent 122 or the application re-platforming service 134 can generate an ongoing measurement of the coverage of the translation process (e.g., indicating what percentage of the functions or total code base discovered during binary translation have been covered during dynamic translation). In some examples, the measurement value can be used to measure whether the dynamic binary translation process has covered a threshold percentage of the code base (e.g., more than 95%, or any other value) and, when the threshold has been exceeded, then the agent 122 or application re-platforming service 134 can terminate the dynamic binary translation process (e.g., with the understanding that it may be impractical or impossible to guarantee that all potential code paths are covered).

In some examples, once the static and dynamic binary translation processes have completed, the application re-platforming service 134 can use a combination of the static and dynamic translation results to generate a re-platformed executable 136. For example, using information contained in the binary translation metadata 210, the application re-platforming service 134 can collect the translated functions, use call graph information obtained from the metadata, and other information to combine the translations into a single binary according to the specifics of the target platform. In some examples, once complete, the service 134 can generate and provide access to a URL or other identifier of a storage location for the re-platformed executable, such that a user initiating the re-platforming can download the executable if desired. In some examples, the application re-platforming service 134 can also optionally generate one or more deployment configurations for the application to be deployed on the target platform, e.g., using one or more managed compute service(s) 110.

In the examples described above, the code for a legacy application is translated from a source instruction set to a target instruction set. In some examples, an intermediary representation can be used to further optimize the software modernization service's 102 ability to re-platform an application from one ISA to any of a number of target hardware platforms and ISAs. For example, in some examples, an agent 122 and re-platforming service 134 can be configured to translate a legacy application binary using the Low Level Virtual Machine (LLVM) compiler and toolchain technologies to first translate a legacy application to an intermediate representation of the code based on the LLVM project, where a compiler can then be used to translate that intermediate representation to any of several different ISAs (e.g., to x86, ARM, PowerPC, etc.). Although LLVM is provided as an example, in general, any intermediate representation that is capable of being further translated into desirable target instruction sets can be used.

Figure 3:
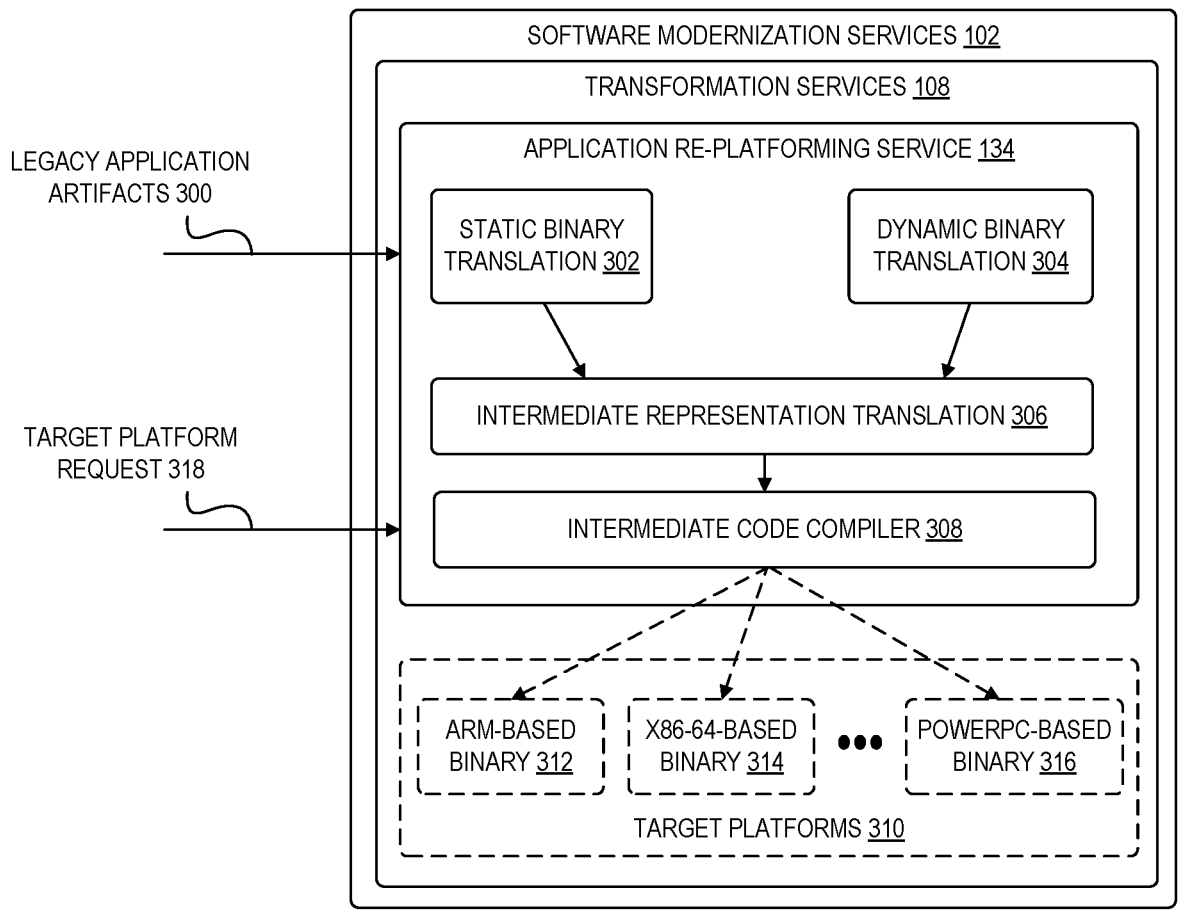
FIG. 3 is a diagram illustrating the use of a language-independent intermediate representation to enable the automated re-platforming of software applications from one ISA to any of a plurality of target ISAs according to some examples.

FIG. 3 is a diagram illustrating the use of a language-independent intermediate representation to enable the automated re-platforming of software applications from one ISA to any of a plurality of target ISAs according to some examples. As shown, the application re-platforming service 134 (or an agent 122) obtains legacy application artifacts 300 (e.g., the entire application binary or portions of the binary code obtained from an agent 122) and performs a static binary translation 302 and dynamic binary translation 304 as described above. As shown, rather than translating the binary code directly to a particular target instruction set, the service 134 initially translate the code to an intermediate representation 306 (e.g., based on LLVM or other similar projects). In this example, an intermediate code compiler 308 (e.g., an LLVM-based compiler) can then be used to further translate the intermediate code to one or more target platforms 310, e.g., to form an ARM-based binary 312, x86-64-based binary 314, or a PowerPC-based binary 316, or multiple of those options (e.g., based on one or more platforms specified by a user in a target platform request 318).

Figure 4:
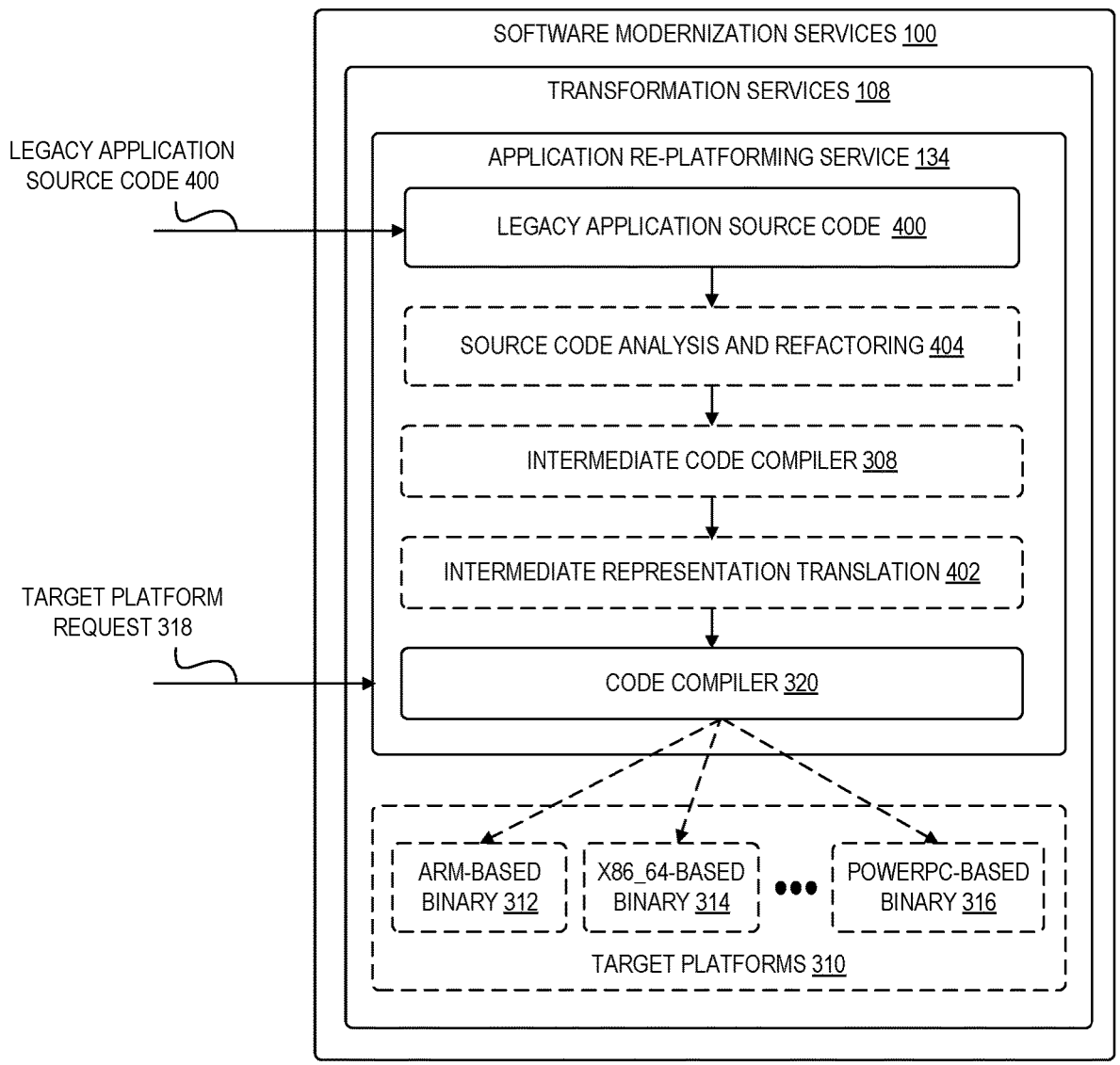
FIG. 4 is a diagram illustrating the re-platforming of a software application by a software modernization service in cases where a software application's source code is available according to some examples.

FIG. 4 is a diagram illustrating the re-platforming of a software application by a software modernization service in cases where a software application's source code is available according to some examples. In the examples described elsewhere herein, it is assumed that the source code for an application might not be available and thus a translation of the binary code is performed. In cases where the source code for a legacy application is available, a re-platforming process can include obtaining legacy application source code 400 and optionally using tools provided by the software modernization service 102 to perform source code analysis and refactoring 404. For example, the source code analysis and refactoring 404 can include the application re-platforming service 134 identifying library or function incompatibilities, anti-patterns, or other issues with the source code 400 that may present issues when attempting to cross-compile the source code for one or more desired target platforms 310. In some examples, the application re-platforming service 134 can present to a user (e.g., as part of an application assessment report) information about any identified issues in the source code 400, present refactoring recommendations, and possibly automatically perform refactoring actions to help ensure that the source code 400 is in a condition where it can be compiled into an identified target platform 310.

In some examples, the application re-platforming service 134 can also use an intermediate code compiler 308 to convert the application source code into an intermediate representation translation 402. Similar to above, the intermediate representation can be based on the LLVM project or other similar frameworks. Once translated into the intermediate representation translation 402, an intermediate code compiler 308 can then be used to translate the application into one or more target platforms 310. The use of the intermediate representation can again simplify the re-platforming process by avoiding the need for the application re-platforming service 134 to implement a full mesh of platform-to-platform translation processes, among other benefits. In other examples, the legacy application source code 400 can be compiled directly into a binary suitable for a target platform using a platform-specific compiler. For example, a code compiler 320 (which may be same as the intermediate code compiler 308 if an intermediate representation is generated) for a platform can be used to generate build artifacts and to create a binary for a target platform specified in a target platform request 318, where such processes can be orchestrated by the application re-platforming service 134.

Figure 5:
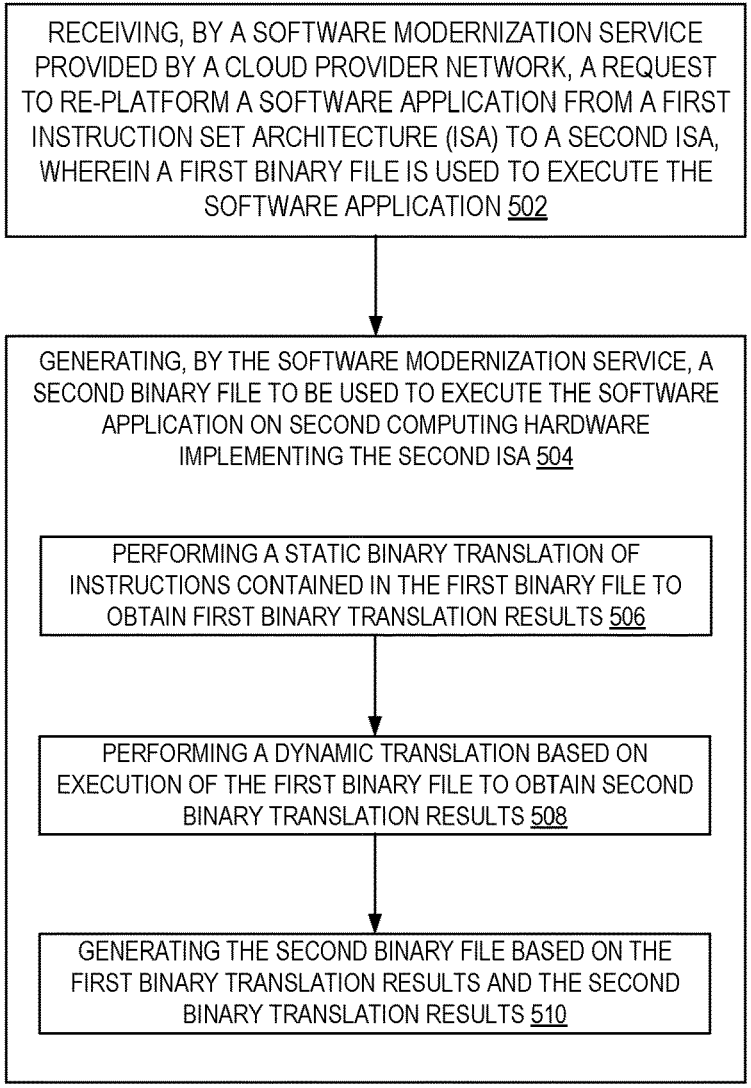
FIG. 5 is a flow diagram illustrating operations of a method for automatically re-platforming software application binaries from one ISA to another according to some embodiments.

FIG. 5 is a flow diagram illustrating operations 500 of a method for providing an application binary re-platforming service as part of software modernization services provided by a cloud provider network according to some embodiments. Some or all the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by a modernization agent, software modernization services, or other components of the other figures or combinations thereof.

The operations 500 include, at block 502, receiving, by a software modernization service provided by a cloud provider network, a request to re-platform a software application from a first instruction set architecture (ISA) to a second ISA; and The operations 500 further include, at block 504, generating, by the software modernization service, a second binary file to be used to execute the software application on second computing hardware implementing the second ISA.

The operations at block 504 include, at block 506, performing a static binary translation of instructions contained in the first binary file to obtain first binary translation results, The operations at block 504 further include, at block 508, performing a dynamic translation based on execution of the first binary file to obtain second binary translation results, and The operations at block 504 further include, at block 510, generating the second binary file based on the first binary translation results and the second binary translation results.

In some examples, the operations further include generating, by the software modernization service, an assessment report of the software application, wherein the assessment report includes a recommendation to re-platform the software application from the first ISA to the second ISA; and wherein the request to re-platform the software application from the first ISA to the second ISA is generated responsive to input selecting the recommendation.

In some examples, the operations further include launching, using a managed compute service of the cloud provider network, the second binary file on a computing resource that implements the second ISA.

In some examples, the static translation involves translating the instructions contained in the first binary file to a language-independent intermediate representation, wherein the dynamic translation involves translating instructions obtained from the first binary file during runtime to the language-independent intermediate representation, and the operations further include: using a compiler associated with the language-independent intermediate representation to compile the first binary translation results and the second binary translation results into the second binary file.

In some examples, the operations further include determining a percentage of the code base of the software application covered by the dynamic binary translation relative to the static binary translation; and terminating the dynamic translation responsive to determining that the percentage of the code base exceeds a threshold.

In some examples, performing the dynamic translation includes receiving, by the software modernization service, series of instructions obtained from an agent running in a computing environment that is distinct from the cloud provider network, wherein the agent obtains the series of instructions by executing the first binary file in the computing environment.

In some examples, the second ISA is based on one of: x86 ISA, ARM ISA, PowerPC ISA, Microprocessor without Interlocked Pipelined Stages (MIPS) ISA, Sparc ISA, or RISC-V ISA.

In some examples, the operations further include storing, in a datastore, information about the binary translation process, wherein the information includes: identifiers of portions of the first binary, checksums generated based on instructions contained in each portion of the first binary, and locations of binary translations of each of the portions of the first binary code.

In some examples, the operations further include storing, in a datastore, information about the binary translation process, wherein the information includes: identifiers of portions of the first binary file, checksums generated based on instructions contained in each of the portions of the first binary file, and locations of binary translations of each of the portions of the first binary file.

In some examples, the software modernization service assigns an identifier to a process for generating the second binary file, and the operations further include: receiving a request including the identifier and requesting status information for the process for generating the second binary file; and returning an indication of the status of the process for generating the second binary file.

In some examples, the first binary translation results and the second binary translation results are combined into a language-independent intermediate representation, and wherein the method further comprises compiling the language-independent intermediate representation into two or more binary files including the second binary file, and wherein each of the two or more binary files is associated with a different ISA.

In some examples, the operations further include providing an identifier of a storage location at which the second binary file is stored, wherein the identifier of the storage location can be used to download the second binary file.

Figure 6:
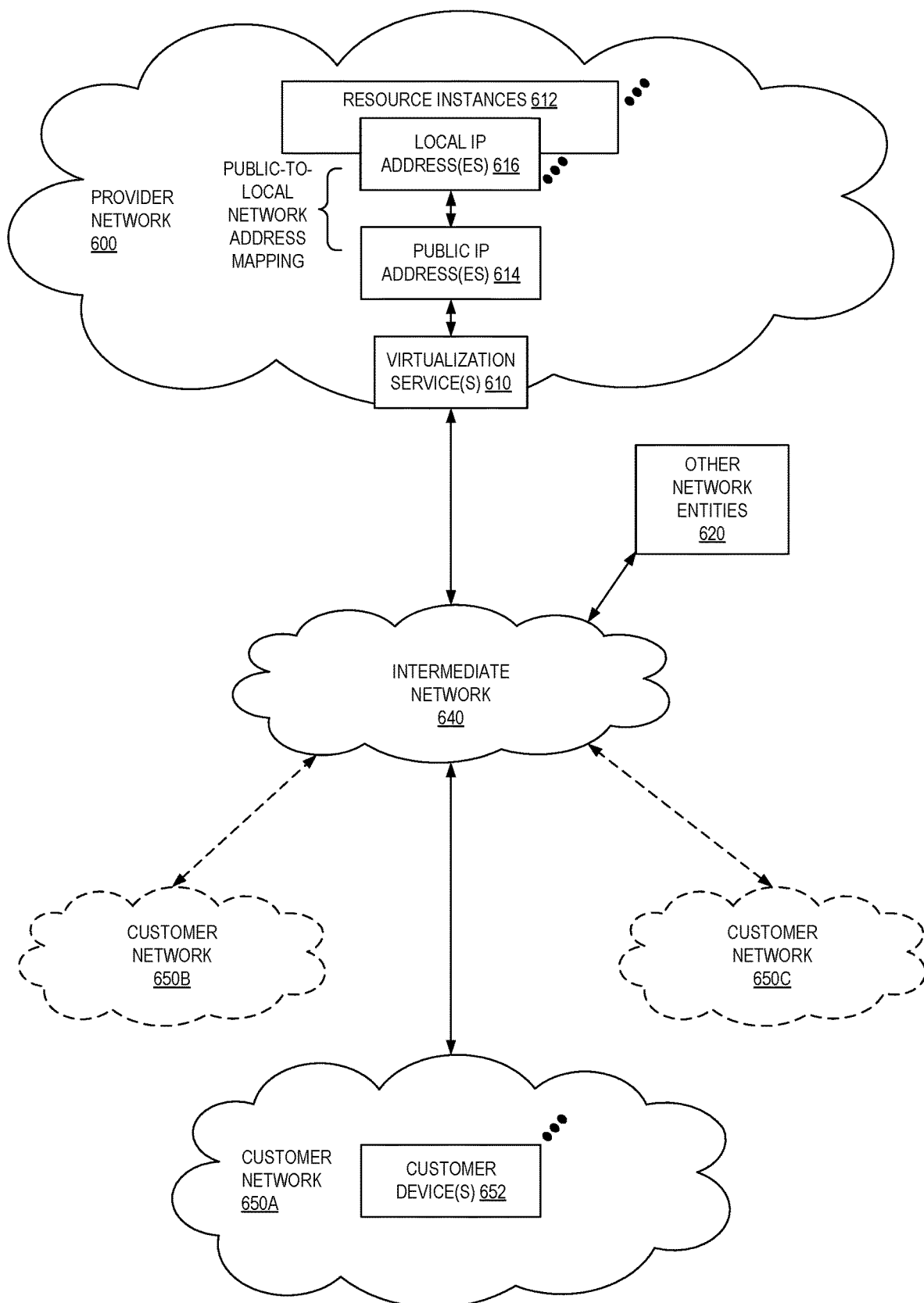
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
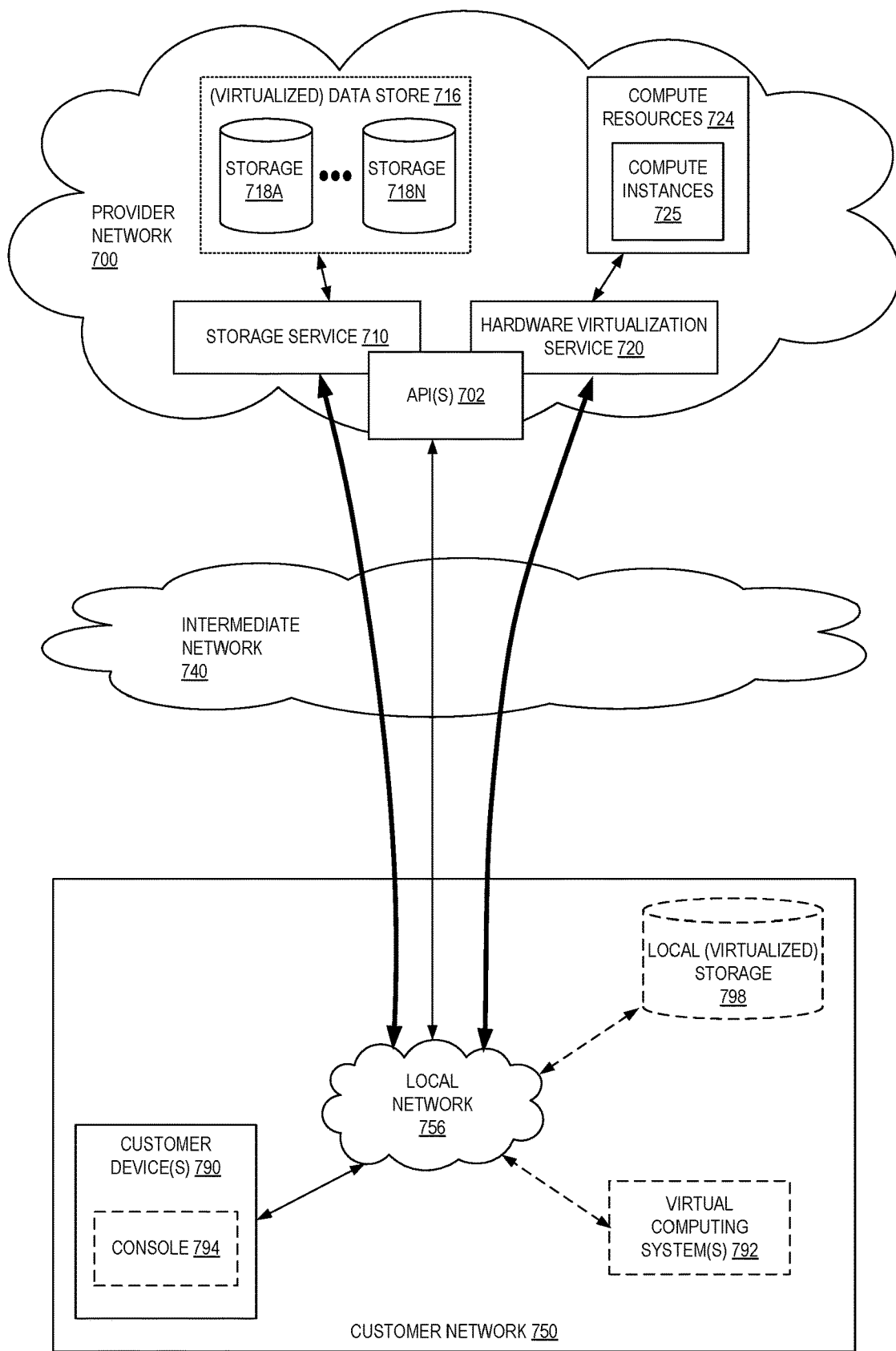
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
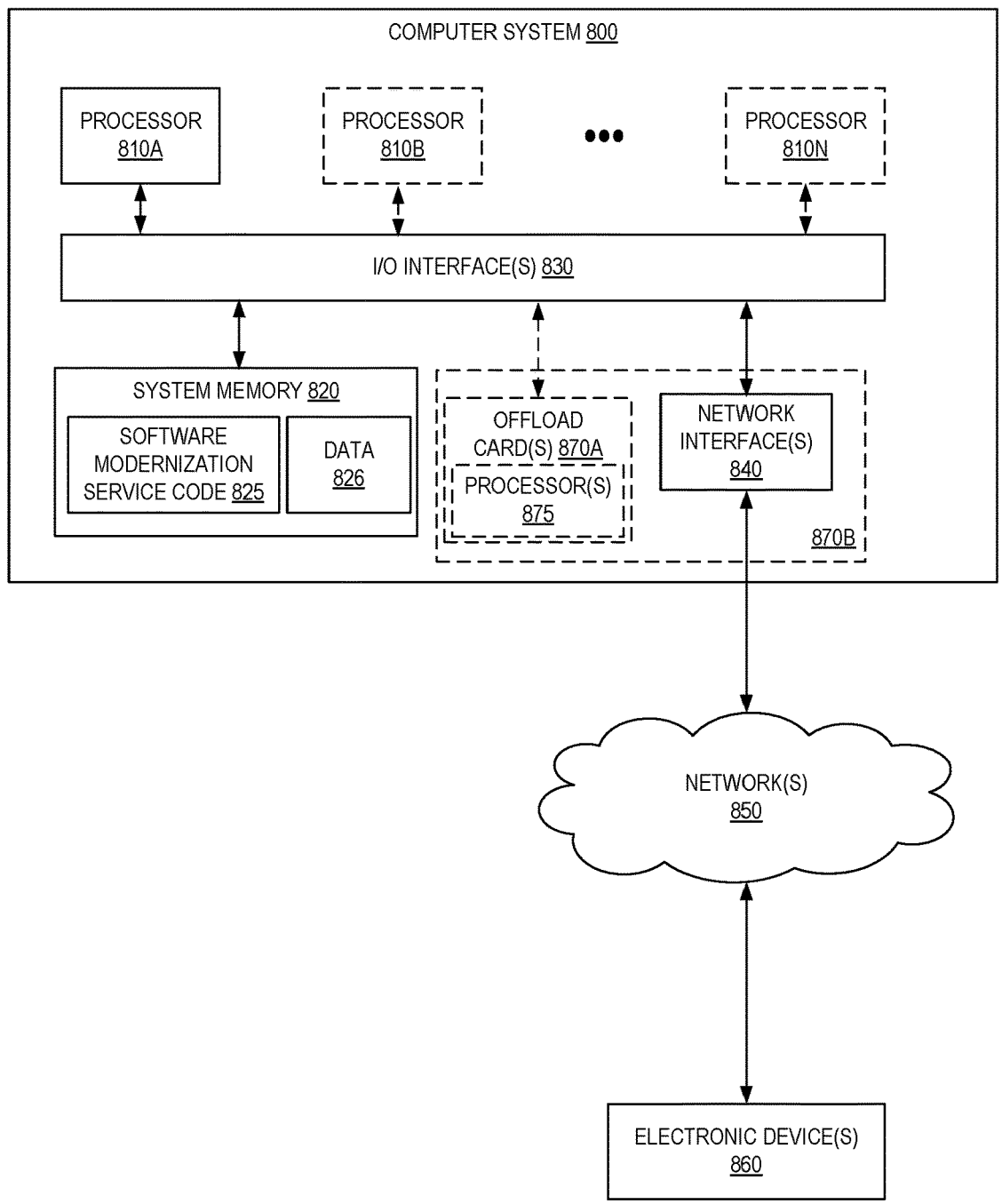
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as software modernization service code 825 (e.g., executable to implement, in whole or in part, the software modernization service 102) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving, by a software modernization service provided by a cloud provider network, a request to re-platform a software application from a first instruction set architecture (ISA) to a second ISA, wherein a first binary file used to execute the software application on computing hardware implementing the first ISA is stored in a computing environment that is distinct from the cloud provider network; and
   generating, at least in part by computing resources provisioned by the software modernization service, a second binary file to be used to execute the software application on second computing hardware implementing the second ISA by:
      performing a static binary translation of instructions contained in the first binary file to obtain first binary translation results, wherein the static binary translation involves translating instructions contained in the first binary file to a language-independent intermediate representation,
      performing a dynamic binary translation based on execution of the first binary file to obtain second binary translation results, wherein the dynamic binary translation involves translating instructions obtained from the first binary file during runtime to the language-independent intermediate representation,
      determining a percentage of code contained in the first binary file covered by the dynamic binary translation relative to the static binary translation,
      terminating the dynamic binary translation responsive to determining that the percentage of the code exceeds a threshold,
      combining the first binary translation results and the second binary translation results to obtain combined translation results, and
      using a compiler associated with the language-independent intermediate representation to compile the combined translation results into the second binary file.

2. The computer-implemented method of claim 1, further comprising:
   generating, by the software modernization service, an assessment report of the software application, wherein the assessment report includes a recommendation to re-platform the software application from the first ISA to the second ISA; and
   wherein the request to re-platform the software application from the first ISA to the second ISA is generated responsive to input selecting the recommendation.

3. The computer-implemented method of claim 1, further comprising launching, using a managed compute service of the cloud provider network, the second binary file on a computing resource that implements the second ISA.

4. A computer-implemented method comprising:
   receiving, by a software modernization service provided by a cloud provider network, a request to re-platform a software application from a first instruction set architecture (ISA) to a second ISA, wherein a first binary file is used to execute the software application; and
   generating, by the software modernization service, a second binary file to be used to execute the software application on second computing hardware implementing the second ISA by:
      performing a static binary translation of instructions contained in the first binary file to obtain first binary translation results,
      performing a dynamic binary translation based on execution of the first binary file to obtain second binary translation results,
      determining a percentage of code contained in the first binary file covered by the dynamic binary translation relative to the static binary translation, terminating the dynamic binary translation responsive to determining that the percentage of the code exceeds a threshold, and generating the second binary file based on the first binary translation results and the second binary translation results.

5. The computer-implemented method of claim 4, further comprising:

generating, by the software modernization service, an assessment report of the software application, wherein the assessment report includes a recommendation to re-platform the software application from the first ISA to the second ISA; and wherein the request to re-platform the software application from the first ISA to the second ISA is generated responsive to input selecting the recommendation.

6. The computer-implemented method of claim 4, further comprising launching, using a managed compute service of the cloud provider network, the second binary file on a computing resource that implements the second ISA.

7. The computer-implemented method of claim 4, wherein the static binary translation involves translating the instructions contained in the first binary file to a language-independent intermediate representation, wherein the dynamic binary translation involves translating instructions obtained from the first binary file during runtime to the language-independent intermediate representation, and wherein the method further comprises:

using a compiler associated with the language-independent intermediate representation to compile the first binary translation results and the second binary translation results into the second binary file.

8. The computer-implemented method of claim 4, wherein performing the dynamic binary translation includes receiving, by the software modernization service, series of instructions obtained from an agent running in a computing environment that is distinct from the cloud provider network, wherein the agent obtains the series of instructions by executing the first binary file in the computing environment.

9. The computer-implemented method of claim 4, wherein the second ISA is based on one of: x86-32 ISA, x86-64 ISA, ARM ISA, PowerPC ISA, Microprocessor without Interlocked Pipelined Stages (MIPS) ISA, Sparc ISA, or RISC-V ISA.

10. The computer-implemented method of claim 4, further comprising storing, in a datastore, information about generation of the second binary file, wherein the information includes: identifiers of portions of the first binary file translated by the software modernization service, checksums generated based on instructions contained in each of the portions of the first binary file, and storage locations of binary translations of each of the portions of the first binary file.

11. The computer-implemented method of claim 4, wherein the software modernization service assigns an identifier to a process for generating the second binary file, and wherein the method further comprises:

receiving a request including the identifier and requesting status information for the process for generating the second binary file; and returning an indication of the status of the process for generating the second binary file.

12. The computer-implemented method of claim 4, wherein the first binary translation results and the second binary translation results are combined into a language-independent intermediate representation, and wherein the method further comprises compiling the language-independent intermediate representation into two or more binary files including the second binary file, and wherein each of the two or more binary files is associated with a different ISA.

13. The computer-implemented method of claim 4, further comprising providing an identifier of a storage location at which the second binary file is stored, wherein the identifier of the storage location can be used to download the second binary file.

14. The computer-implemented method of claim 4, wherein the software application is a first software application, and wherein the method further comprises:

receiving, by the software modernization service, a request to re-platform a second software application from the first ISA to the second ISA, wherein the request identifies a location of source code used to implement the second software application;

analyzing the source code to identify at least one incompatibility in the source code relative to the second ISA;

refactoring the source code to address the at least one incompatibility; and compiling the source code to generate a third binary file to be used to execute the software application on the second computing hardware implementing the second ISA.

15. A system comprising:

a first one or more electronic devices to implement a software modernization service in a multi-tenant provider network, wherein the software modernization service includes instructions that upon execution cause the software modernization service to:

receive, by a software modernization service provided by a cloud provider network, a request to re-platform a software application from a first instruction set architecture (ISA) to a second ISA, wherein a first binary file is used to execute the software application; and generate, by the software modernization service, a second binary file to be used to execute the software application on second computing hardware implementing the second ISA by:

perform a static binary translation of instructions contained in the first binary file to obtain first binary translation results, perform a dynamic binary translation based on execution of the first binary file to obtain second binary translation results, determine a percentage of code contained in the first binary file covered by the dynamic binary translation relative to the static binary translation, terminate the dynamic binary translation responsive to determining that the percentage of the code exceeds a threshold, and combine the first binary translation results and the second binary translation results to create the second binary file; and a second one or more electronic devices to implement a modernization agent, wherein the modernization agent includes instructions that upon execution cause the modernization agent to:

obtain the software application from a computing environment that is distinct from the multi-tenant provider network, provide, to the software modernization service, information related to the software application used to generate the second binary file.

16. The system of claim 15, wherein the software modernization service further includes instructions that upon execution cause the software modernization service to generate, by the software modernization service, an assessment report of the software application, wherein the assessment report includes a recommendation to re-platform the software application from the first ISA to the second ISA; and
   wherein the request to re-platform the software application from the first ISA to the second ISA is generated responsive to input selecting the recommendation.

17. The system of claim 15, wherein the software modernization service further includes instructions that upon execution cause the software modernization service to launch, using a managed compute service of the cloud provider network, the second binary file on a computing resource that implements the second ISA.

18. The system of claim 15, wherein the static binary translation involves translating the instructions contained in the first binary file to a language-independent intermediate representation, wherein the dynamic translation involves translating instructions obtained from the first binary file during runtime to the language-independent intermediate representation, and wherein the software modernization service further includes instructions that upon execution cause the software modernization service to:
   use a compiler associated with the language-independent intermediate representation to compile the first binary translation results and the second binary translation results into the second binary file.

19. The system of claim 15, wherein performing the dynamic binary translation includes receiving, by the software modernization service, series of instructions obtained from an agent running in a computing environment that is distinct from the cloud provider network, and wherein the agent obtains the series of instructions by executing the first binary file in the computing environment.

20. The system of claim 15, wherein the software modernization service further includes instructions that upon execution cause the software modernization service to store, in a datastore, information about generation of the second binary file, wherein the information includes: identifiers of portions of the first binary file translated by the software modernization service, checksums generated based on instructions contained in each of the portions of the first binary file, and storage locations of binary translations of each of the portions of the first binary file.

* * * * *